US008337216B1

(12) United States Patent
Miller

(10) Patent No.: US 8,337,216 B1
(45) Date of Patent: Dec. 25, 2012

(54) TOUCH SENSOR BACK PLANE GROUND CONNECTION

(75) Inventor: Thayne M. Miller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/191,368

(22) Filed: Jul. 26, 2011

(51) Int. Cl.
*H01R 12/00* (2006.01)

(52) U.S. Cl. .......................................................... 439/67

(58) Field of Classification Search ............... 439/65, 439/67; 178/18.01–18.11; 345/173–178
See application file for complete search history.

(56) References Cited

U.S. PATENT DOCUMENTS

| | | | |
|---|---|---|---|
| 3,757,322 A * | 9/1973 | Barkan et al. ................. 345/174 |
| 4,492,958 A * | 1/1985 | Minami ......................... 345/174 |
| 4,896,946 A * | 1/1990 | Suzuki et al. ................. 349/150 |
| 5,436,744 A * | 7/1995 | Arledge et al. ............... 349/150 |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,046,886 A * | 4/2000 | Himes et al. ................. 360/245.9 |
| 6,188,391 B1 * | 2/2001 | Seely et al. ................... 345/173 |
| 6,310,610 B1 * | 10/2001 | Beaton et al. ................. 345/173 |
| 6,320,691 B1 * | 11/2001 | Ouchi et al. .................. 359/237 |
| 6,323,846 B1 | 11/2001 | Westerman et al. |
| 6,450,026 B1 * | 9/2002 | Desarnaud ................ 73/335.04 |
| 6,562,659 B1 * | 5/2003 | Izumi et al. ................... 438/118 |
| 6,570,707 B1 * | 5/2003 | Murakami et al. ....... 359/489.07 |
| 6,590,622 B1 * | 7/2003 | Nakanishi et al. ............. 349/12 |
| 6,690,361 B1 * | 2/2004 | Kang et al. .................... 345/173 |
| 6,690,387 B2 | 2/2004 | Zimmerman et al. |
| 6,777,621 B2 * | 8/2004 | Ishikawa et al. .............. 174/260 |
| 7,015,894 B2 | 3/2006 | Morohoshi |
| 7,184,064 B2 | 2/2007 | Zimmerman et al. |
| 7,279,641 B2 * | 10/2007 | Shikina ......................... 174/254 |
| 7,436,481 B2 * | 10/2008 | You et al. ...................... 349/150 |
| 7,633,564 B2 * | 12/2009 | Hong et al. ..................... 349/12 |
| 7,663,607 B2 | 2/2010 | Hotelling et al. |
| 7,893,413 B1 * | 2/2011 | Appleby et al. ............ 250/505.1 |
| 7,911,560 B2 * | 3/2011 | Kamiya ........................... 349/74 |
| 7,999,795 B2 * | 8/2011 | Hamblin et al. .............. 345/173 |
| 8,026,905 B2 * | 9/2011 | Hamblin et al. .............. 345/173 |

(Continued)

FOREIGN PATENT DOCUMENTS

JP 2000-163031 A 6/2000

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Amy C. Johnson
*Assistant Examiner* — Vladimir Imas

(57) ABSTRACT

Touch sensor panels can use touch sensors to detect the presence and location of a touch event. In order for the touch sensors to function reliably, the back plane of the touch sensor panel should be grounded. Supplying this ground connection can provide a uniform electrical reference point from which changes in voltage and capacitance due to a touch event can be measured. Without this ground connection, touch sensors may misrepresent the touch event. Various embodiments of the present disclosure provide different means for providing a ground connection for the back plane of a touch sensor panel. These embodiments are designed to provide a reliable ground connection even in the presence of various failure conditions.

24 Claims, 10 Drawing Sheets

U.S. PATENT DOCUMENTS

| | | | | |
|---|---|---|---|---|
| 8,049,193 | B1* | 11/2011 | Appleby et al. | 250/505.1 |
| 8,049,731 | B2* | 11/2011 | Baker et al. | 345/173 |
| 8,074,351 | B2* | 12/2011 | Hamada et al. | 29/833 |
| 8,153,016 | B2* | 4/2012 | Hotelling et al. | 216/80 |
| 8,189,339 | B2* | 5/2012 | Mackey et al. | 361/749 |
| 8,209,861 | B2* | 7/2012 | Long et al. | 29/847 |
| 8,228,306 | B2* | 7/2012 | Long et al. | 345/173 |
| 2002/0054261 | A1* | 5/2002 | Sekiguchi | 349/122 |
| 2002/0098612 | A1* | 7/2002 | Ahn et al. | 438/51 |
| 2005/0099402 | A1* | 5/2005 | Nakanishi et al. | 345/173 |
| 2005/0205980 | A1* | 9/2005 | Manansala | 257/680 |
| 2005/0260338 | A1* | 11/2005 | Chien | 427/96.1 |
| 2006/0022910 | A1* | 2/2006 | Sekiya et al. | 345/76 |
| 2006/0026521 | A1 | 2/2006 | Hotelling et al. | |
| 2006/0197753 | A1 | 9/2006 | Hotelling | |
| 2007/0257893 | A1* | 11/2007 | Philipp et al. | 345/173 |
| 2008/0074398 | A1* | 3/2008 | Wright | 345/173 |
| 2008/0106522 | A1* | 5/2008 | Nishikawa et al. | 345/173 |
| 2008/0136788 | A1* | 6/2008 | Nishikawa et al. | 345/173 |
| 2008/0143906 | A1* | 6/2008 | Allemand et al. | 349/43 |
| 2008/0158181 | A1* | 7/2008 | Hamblin et al. | 345/173 |
| 2008/0309633 | A1* | 12/2008 | Hotelling et al. | 345/173 |
| 2009/0273570 | A1* | 11/2009 | Degner et al. | 345/173 |
| 2009/0283300 | A1* | 11/2009 | Grunthaner | 174/254 |
| 2010/0053114 | A1* | 3/2010 | Kaigawa | 345/174 |
| 2010/0079264 | A1* | 4/2010 | Hoellwarth | 340/407.2 |
| 2010/0295819 | A1* | 11/2010 | Ozeki et al. | 345/174 |
| 2011/0088770 | A1* | 4/2011 | Allemand et al. | 136/256 |
| 2011/0094098 | A1* | 4/2011 | Hamblin et al. | 29/846 |
| 2011/0094670 | A1* | 4/2011 | Grunthaner | 156/250 |
| 2011/0181543 | A1* | 7/2011 | Long et al. | 345/174 |
| 2012/0026123 | A1* | 2/2012 | Grunthaner et al. | 345/174 |
| 2012/0081333 | A1* | 4/2012 | Ozeki et al. | 345/174 |

FOREIGN PATENT DOCUMENTS

JP 2002-342033 A 11/2002

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH SENSOR BACK PLANE GROUND CONNECTION

FIELD OF THE DISCLOSURE

This relates generally to multi-touch sensor panels that utilize an array of capacitive sensors to detect and localize touch events and, more particularly, to the grounding of the back plane of the touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens and trackpads are becoming increasingly popular because of their ease and versatility of operation as well as their declining price. These devices can have a touch sensor panel, which can be a substantially clear panel with a touch-sensitive surface. Touch screens can also have a display device such as a liquid crystal display (LCD) that can be positioned partially or fully behind the panel so that the touch-sensitive surface can cover at least a portion of the viewable area of the display device. These devices can allow a user to perform various functions by touching the touch sensor panel using a finger, stylus or other object at a location often dictated by a user interface (UI) being displayed by the display device. In general, these devices can recognize a touch event and the position of the touch event on the touch sensor panel, and the computing system can then interpret the touch event and can perform one or more actions based on the touch event.

Touch sensor panels can, in some embodiments, be formed from a matrix of drive lines (e.g., row traces) separated by a dielectric material from a plurality of sense lines (e.g., column traces), with sensors or pixels created at each crossing point of the drive and sense lines. Touch sensor panels can alternatively be arranged in any number of orientations or dimensions, including, but not limited to, diagonal, concentric circles, spiral, three-dimensional, or random orientations. In order to detect and identify the location of a touch on a touch sensor panel, stimulation signals can be provided to the drive lines, which causes charge to be coupled onto the sense lines. When a finger or other object disrupts this charge coupling, the sense lines generate signals indicative of touch output values. By knowing the timing of the stimulation signals provided to specific drive lines relative to the signals read out of the sense lines, processor(s) can be used to determine where on the touch sensor panel a touch event occurred.

In order for the touch sensors to correctly identify the presence and location of a touch event, the back plane of the touch sensor panel should be reliably grounded. Supplying a reliable ground connection for the back plane may be useful in providing a uniform electrical reference point to measure changes in voltage and capacitance due to a touch event. If the back plane is not properly grounded, the touch sensors may behave sporadically and misrepresent touch events or fail altogether.

SUMMARY

Touch sensor panels can use touch sensors to detect the presence and location of a touch event. In order for the touch sensors to function reliably, the back plane of the touch sensor panel should be grounded. Supplying this ground connection can provide a uniform electrical reference point from which changes in voltage and capacitance due to a touch event can be measured. Without this ground connection, touch sensors may misrepresent the touch event. These misrepresentations can include, but are not limited to, errors in the location of a touch event or the detection of a phantom touch in the absence of an actual touch event. In extreme cases, the touch sensors may fail altogether.

Various embodiments of the present disclosure provide different means for providing a ground connection for the back plane of a touch sensor panel. These embodiments are designed to provide a reliable ground connection even in the presence of various failure conditions.

DETAILED DESCRIPTION

In the following description of preferred embodiments, reference is made to the accompanying drawings which form a part hereof, and in which it is shown by way of illustration specific embodiments that can be practiced. It is to be understood that other embodiments can be used and structural changes can be made without departing from the scope of the embodiments of this disclosure.

Embodiments of the disclosure relate to different means for connecting the back plane of a touch sensor panel to the device chassis or body of the touch sensor panel. In order for the touch sensors in a touch sensor panel to function reliably, the back plane of the touch sensor panel should be grounded. Supplying this ground connection can provide a uniform electrical reference point from which changes in voltage and capacitance due to a touch event can be measured. Without this ground connection, touch sensors may misrepresent the touch event. These misrepresentations can include, but are not limited to, errors in the location of a touch event or the detection of a phantom touch in the absence of an actual touch event. In extreme cases, the touch sensors may fail altogether. In order to properly ground the touch sensor panel's back plane, the device chassis or frame of the touch sensor panel may be used. Because the device chassis or frame may be connected to earth ground or can at least function as a reference ground, the back plane may also be grounded by connecting it to the device chassis or frame using an electrically conductive film. This electrically conductive film may be shaped, for example, as a tail that connects the back plane to the device chassis. This application uses the terms "conductive film" and "tail" interchangeably. The tail can be fastened to the device chassis using a screw. The tail should be constructed to provide a reliable electrical connection between the back plane and device chassis in the presence of different failure conditions.

Figure 1:
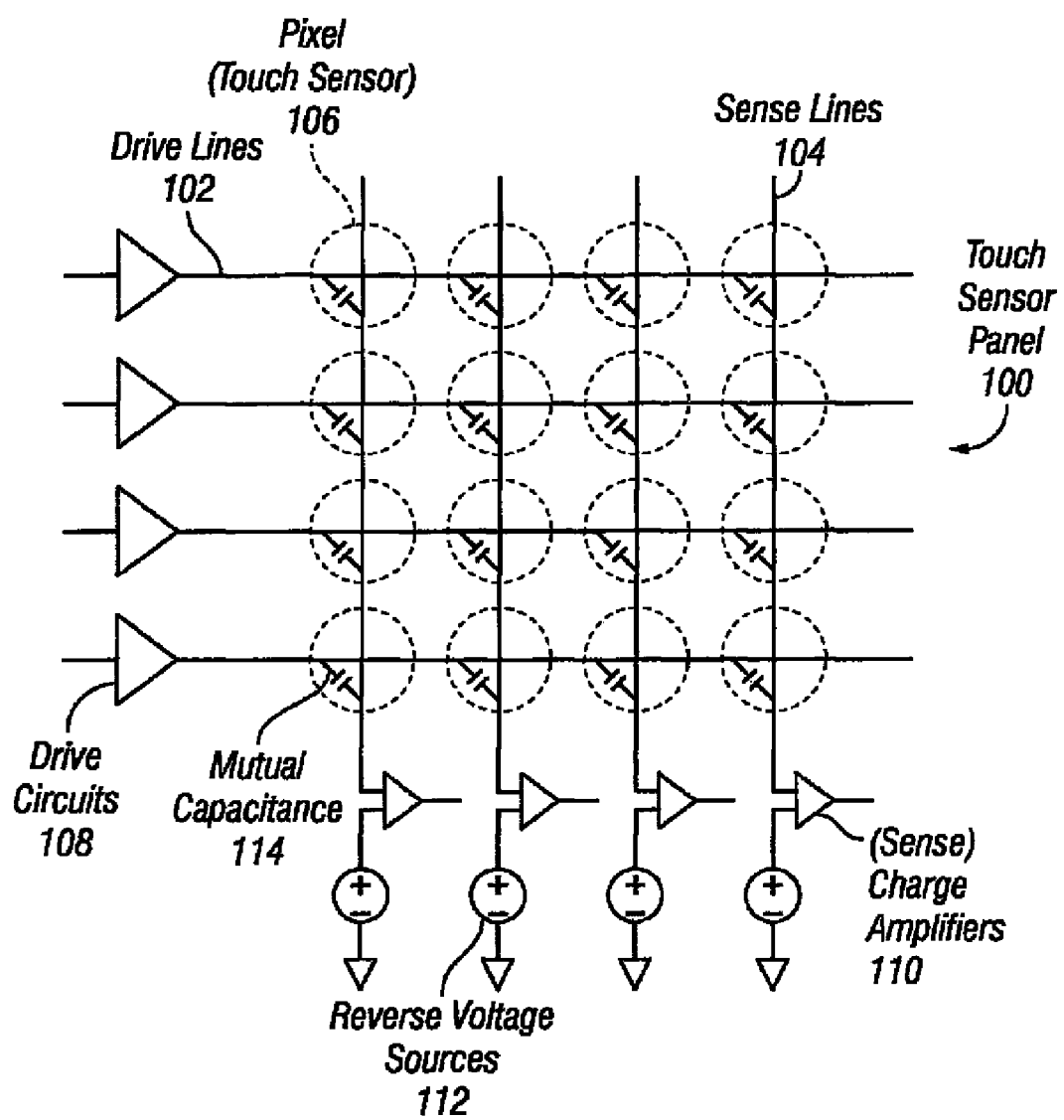
FIG. 1 illustrates an example touch sensor panel according to embodiments of the disclosure.

FIG. 1 illustrates an exemplary touch sensor panel 100 according to embodiments of the disclosure. Touch sensor panel 100 includes an array of pixels 106 (also referred to as touch sensors) that can be formed by a two-layer electrode structure separated by a dielectric material. This application uses the words "pixels" and "touch sensors" interchangeably. One layer of electrodes comprises a plurality of drive lines 102 positioned perpendicular to another layer of electrodes comprising a plurality of sense lines 104. The pixels 106 can be formed at the crossing points of the drive lines 102 and sense lines 104, with each of the pixels 106 having an associated mutual capacitance 114 (also referred to as coupling capacitance) when the drive lines are stimulated.

Drive lines 102 (also referred to as rows, row traces, or row electrodes) can be activated by stimulation signals provided by respective drive circuits 108. Each of the drive circuits 108 can be coupled to an alternating current (AC) voltage source referred to as a stimulation signal source. The stimulation signals from the drive circuits 108 may also be referred to as forward driving signals or forward stimulation signals. Sense lines 104 (also referred to as columns, column traces, or column electrodes) are coupled to sense amplifiers 110, which can detect changes in charge coupling on the sense lines 104. The sense amplifiers 110 may also be referred to as charge amplifiers or trans-conductance amplifiers.

To sense touch event(s) on the touch sensor panel 100, each of the drive lines 102 can be stimulated by the drive circuits 108, and the sense amplifiers 110 can convert the charge coupled onto the sense lines 104 into voltage values. The voltage values are representative of pixel touch output values, with changes to the voltage values indicating the pixel location(s) where the touch event(s) occurred and the amount of touch that occurred at those location(s).

Figure 2:
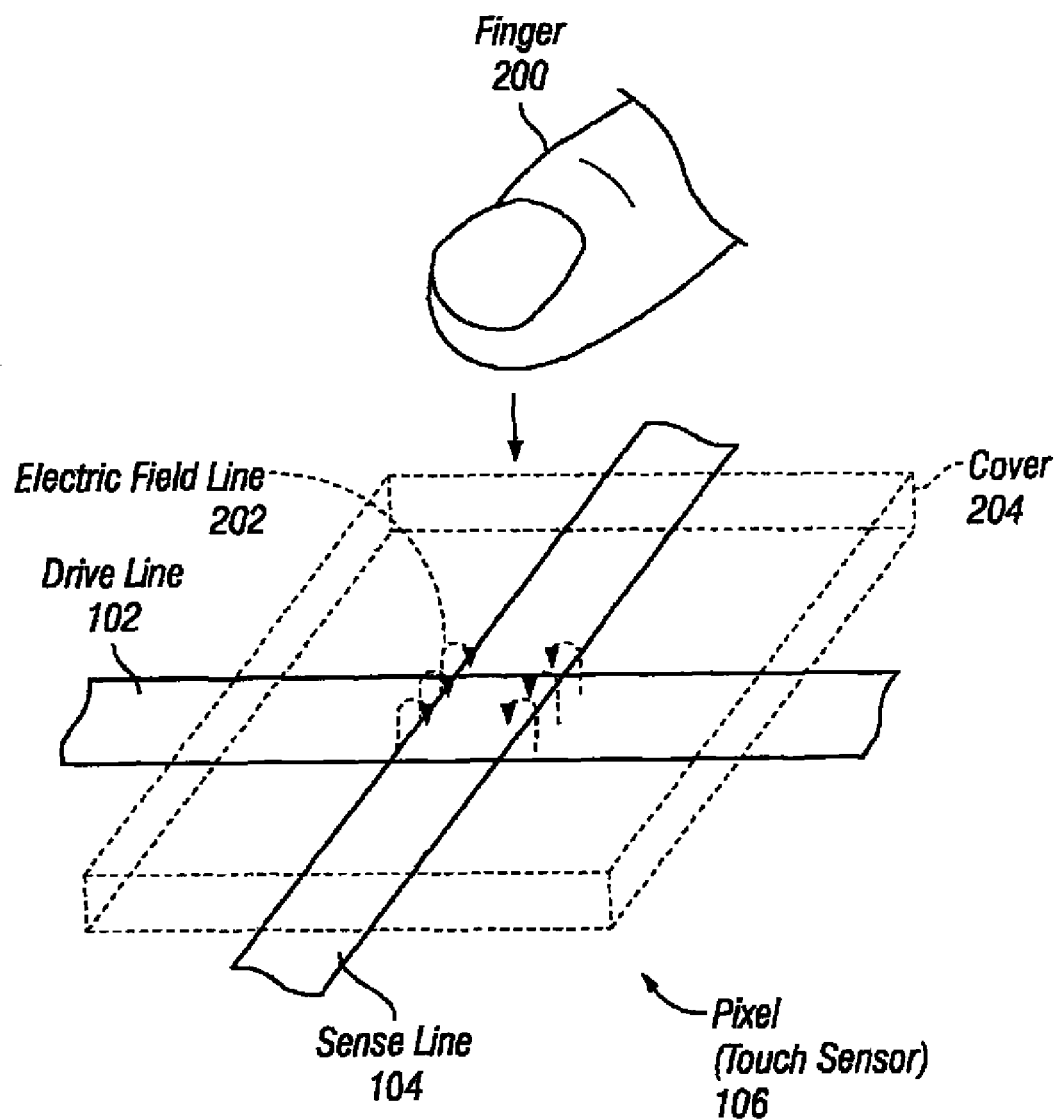
FIG. 2 illustrates a close-up of an example pixel of the touch sensor panel with an impending touch event by a finger according to embodiments of the disclosure.

FIG. 2 illustrates a close-up of a single exemplary pixel 106 with an impending touch event by a finger 200. When the pixel 106 is not touched by an object, an electric field (shown as fringing electric field lines 202) can be formed between the drive line 102 and the sense line 104 via a dielectric material. Some of the electric field lines 202 can extend above the drive and sense lines 102, 104 and even above a cover 204 located over the touch sensor panel 100. When an object, such as the finger 200, touches the pixel 106 (or hovers at a location near the pixel 106), the object blocks some of the electric field lines 202 extending above the cover 204. Such blockage or interruption of the electric field lines 202 changes the capacitance associated with the pixel 106, which changes the charge coupling and current flow from the drive line 102 to the sense line 104 (current is proportional to capacitance), and which in turn changes the voltage value detected at the sense line 104. The magnitude of this change in voltage can be determined by comparing the resulting voltage due to the touch event relative to a uniform electrical reference point. In the absence of a uniform electrical reference point, sense lines 104 and sense amplifiers 110 may incorrectly measure the change in charge coupling and, consequently, the voltage due to a touch event. This error may result, for example, in a misrepresentation of the touch event's presence or its location on touch sensor panel 100. In a worst case scenario, the touch sensor may fail altogether. This uniform electrical reference point may, for example, have a magnitude equal to earth ground (or a reference ground) and may be established by connecting the back plane to the same ground as the sense amplifiers. This can be accomplished by connecting both the back plane of touch sensor panel 100 and the sense amplifiers to a device chassis.

Figure 3:
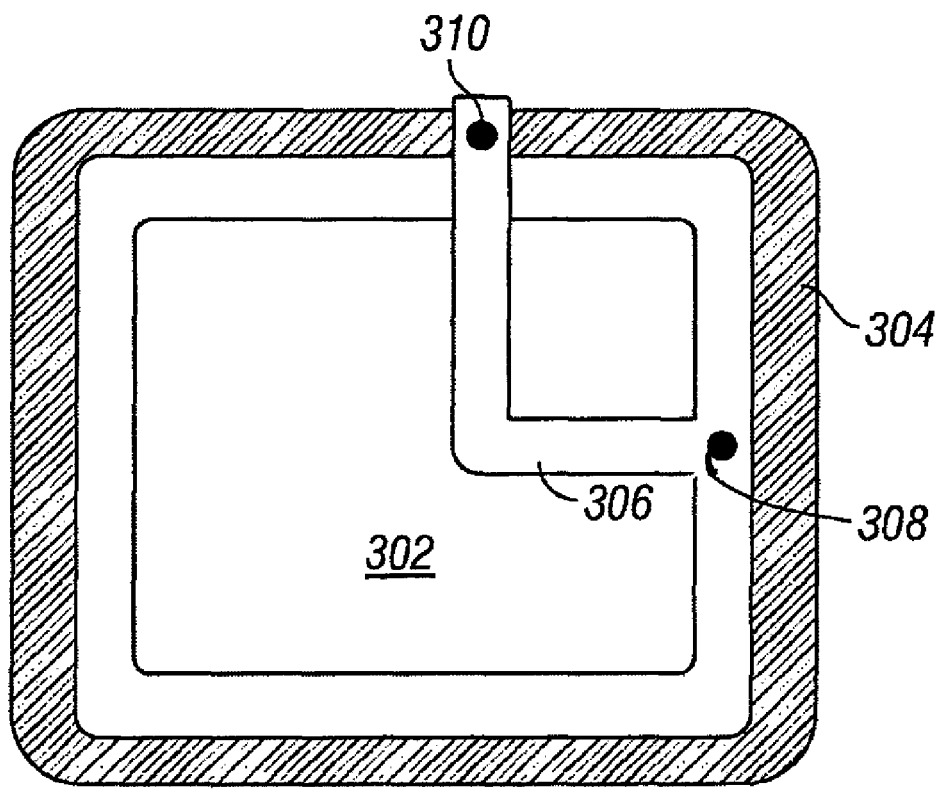
FIG. 3 illustrates a rear view of an example touch sensor panel according to embodiments of the disclosure.

FIG. 3 illustrates the rear surface of the touch sensor panel illustrated in FIG. 1. From this perspective, touch events can occur on the opposite side of the illustrated surface (not shown). The illustrated surface can include a back plane 302 that that can be made from a thin sheet of conductive material. This conductive material may, for example, be indium tin oxide (ITO) for transparent embodiments, or aluminum or copper for non-transparent embodiments. Surrounding back plane 302 is device chassis 304 which can form the frame or structure of the touch sensor panel.

In order to provide the uniform electrical reference point discussed above, an electrically conductive film or tail 306 can be used to connect back plane 302 to device chassis 304. Because the sense amplifiers (not shown) can also be connected to the device chassis, the back plane and the sense amplifiers can all be connected to the same electrical reference point.

Tail 306 can connect to back plane 302 and device chassis 304 at connection points 308 and 310, respectively. With regard to connection point 310, tail 306 can be fastened to device chassis 304 using one or more screws (not shown). In some embodiments, tail 306 may have one side that is electrically conductive and an opposing side that is non-conductive. The conductive side may, for example, be made from aluminum or copper. The non-conductive side may, for example, be made from polyethylene terephthalate (PET) or other type of plastic.

Tail 306 should be designed to provide a reliable ground connection for back plane 302 even in the presence of a failure condition. These failure conditions can include, for example, the formation of a crack in the tail, the formation of corrosion, and problems with the screw interface. A discussion of each failure condition is described below.

Failure Conditions

Cracks

As explained above with respect to FIG. 3, back plane 302 may be grounded by connecting it to device chassis 304 using tail 306. Because tail 306 may be made from an electrically conductive material, the voltage along the tail from the device chassis to the back plane can have a constant value (e.g., earth ground). If, however, a crack forms in tail 306, then electrical connectivity along the tail may be lost. In the presence of such a crack, the electrical connection between the back plane and device chassis can be broken.

Cracks can form wherever a tail bends. As illustrated in FIG. 3, tail 306 can connect to back plane 302 and to device chassis 304 at connection points 308 and 310, respectively. Given the position of the back plane relative to the device chassis, the tail may be bent at each of these connection points in order to connect these components together. If the bend radius at connection points 308 and 310 is too small, a crack may form which can cause the tail's surface to shear.

A crack, however, does not necessarily result in a loss of electrical connectivity. Rather, the type of bend associated with the crack is relevant to the potential loss of electrical connectivity. If, for example, a crack forms along a critical bend, then electrical connectivity may be lost. If, however, a crack forms along a non-critical bend, then electrical connectivity may not be lost. These bend types are discussed in greater detail below in connection with the various exemplary embodiments of the tail. These embodiments aim to reduce the probability of cracks from forming by reducing the number of bends.

Corrosion

Corrosion is the wearing away of a metal due to a chemical reaction. Corrosion can occur when metal is oxidized by an oxidant such as oxygen. Corrosion can also form when a metal is exposed to moisture (e.g., battery acid, humidity). This reaction can create an oxide of the metal which can form a non-conductive oxidation layer along the surface of the metal. Corrosion is more likely to form between two metal surfaces than between a metal and a non-metal surface.

Because the tail has at least one electrically conductive side, corrosion can form along this conductive side if it is in contact with another metal. With respect to FIG. 3, corrosion can form, for example, between tail 306 and device chassis 304 at their connection point. The formation of a non-conductive layer can weaken the electrical connection between these components. Because the tail can also be connected to back plane 302, the weakened electrical connection between the tail and the device chassis can inhibit the grounding of the back plane which, in turn, can cause the touch sensors to act sporadically.

Although corrosion can form between any two adjacent metal surfaces, this application considers the formation of corrosion in two areas—(1) between the screw and the tail and (2) between the tail and the device chassis. The effects of corrosion in these areas are discussed in greater detail below in connection with various exemplary embodiments of the tail.

Screw Interface

The tail can provide an electrical connection between the back plane and device chassis. If, however, the tail becomes unfastened from the device chassis, then the tail and, consequently, the back plane's electrical connection to each other can be lost. This failure condition can occur, for example, if the screw holding the tail to the device chassis pops out from its connection.

The tail should be designed to provide a reliable connection between the ground plane and device chassis in the presence of the failure conditions discussed above. Although the following embodiments are described with respect to these failure conditions, a person of ordinary skill in the art would recognize that other failure conditions may also affect the tail's design.

EMBODIMENTS

First Exemplary Embodiment

Figure 4A:
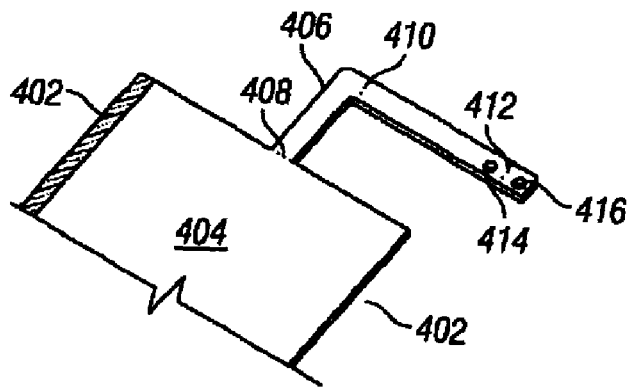
FIGS. 4A, 4B, 4C, and 4D illustrate different configurations of an example tail having two critical bends and one non-critical bend according to embodiments of the disclosure.
Figure 4B:
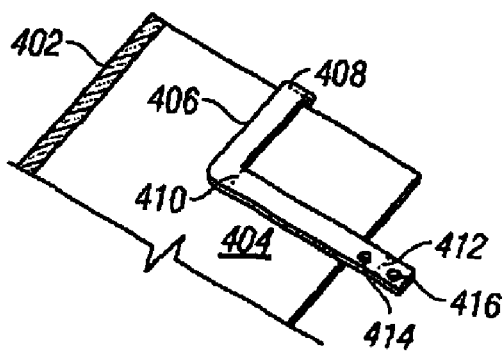
Figure 4C:
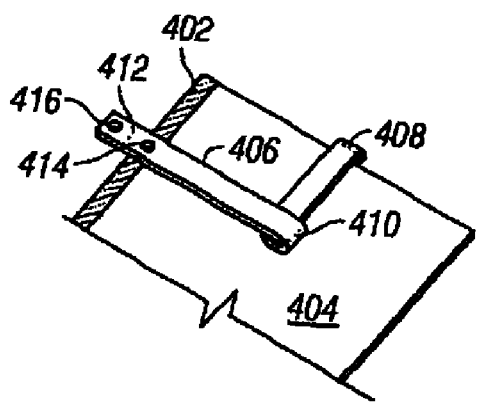
Figure 4D:
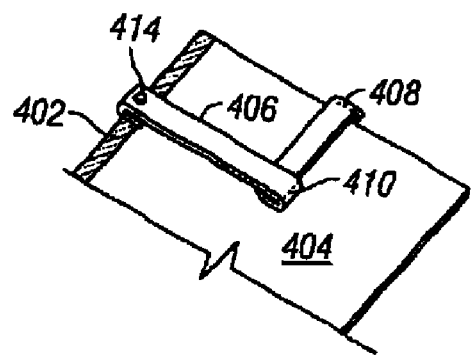

According to a first exemplary embodiment, a conductive film or tail can be bent according to FIGS. 4A, 4B, 4C, and 4D to connect backplane 404 to device chassis 402. FIG. 4A illustrates tail 406 in a first configuration. FIGS. 4B and 4C represent intermediate configurations of tail 406. FIG. 4D represents a fourth configuration of tail 406. Tail 406 can transition from one configuration to another configuration by bending it along its bend lines.

In the first configuration, tail 406 lies flat to the right of back plane 404. As illustrated in FIG. 4A, tail 406 can have three bend lines 408, 410, and 412. Bend lines 408 and 410 can be critical bends. Bend line 412 can be a non-critical bend. On either side of bend line 412 are two holes 414 and 416 which can accommodate a screw (not shown). The hatched region can correspond to device chassis 402.

FIG. 4B illustrates tail 406 in a second configuration. To transition from the first configuration to the second configuration, tail 406 can be folded from right to left along bend line 408 such that tail 406 rests along back plane 404.

FIG. 4C illustrates tail 406 in a third configuration. To transition from the second configuration to the third configuration, tail 406 can be folded upward along bend line 410.

FIG. 4D illustrates tail 406 in a fourth configuration. To transition from the third configuration to the fourth configuration, tail 406 can be folded so that screw hole 416 lies underneath screw hole 414. In the fourth configuration, tail 406 can connect the back plane to device chassis 414. This connection is shown with more detail in FIG. 5.

Figure 5:
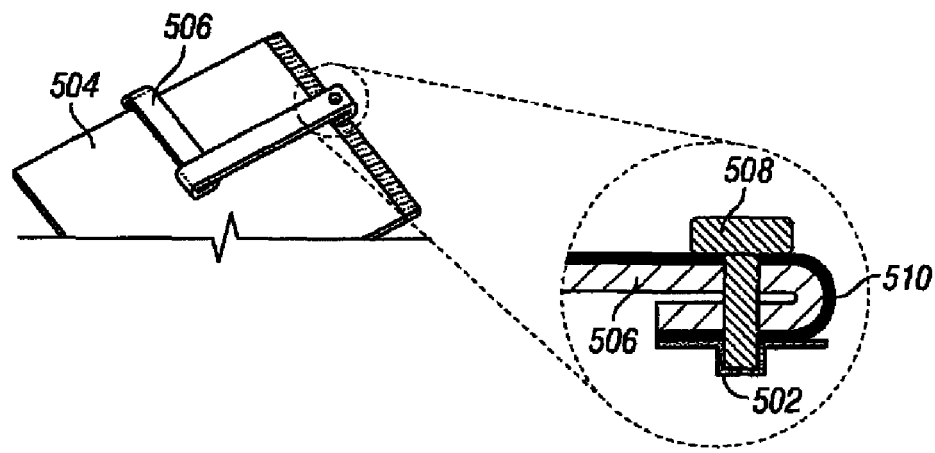
FIG. 5 illustrates a close-up of the example tail illustrated in FIG. 4D according to embodiments of the disclosure.

FIG. 5 illustrates a top of view of the tail from FIG. 4D and provides a detailed view of its surfaces. Tail 506 can lie on back plane 504 and can have two surfaces, one shaded in black and another shaded with hatch marks. The black surface can represent the tail's electrically conductive side. The hatched surface can represent the tail's non-conductive side. Tail 506 can be bent underneath itself such that its screw holes line up with each other. An enlarged cross-sectional view of this bend is also provided in FIG. 5. As shown in the enlarged view, the electrically conductive (i.e., black) side of tail 506 can be in direct contact with device chassis 502. A screw 508 can be inserted through the screw holes to fasten tail 506 to device chassis 502.

FIG. 5 illustrates the electrical connection between tail 506, device chassis 502, and back plane 504. As mentioned above, tail 506 can be in direct electrical contact with device chassis 502. Tail 506 can also be electrically connected to back plane 504 because a portion of the tail's conductive side can lie on the back plane. As such, an electrical connection exists between device chassis 502, tail 506, and back plane 504. Because sense amplifiers (not shown) can also be connected to device chassis 502, back plane 504 and the sense amplifiers can be connected the same electrical reference point. The presence of a failure condition, however, may affect the reliability of this electrical connection. For example, if a crack forms along any one of the tail's critical bends, then electrical connectivity between the device chassis and back plane may be lost. The effects of these failure conditions are discussed below.

Cracks

As explained above, cracks can form along a tail's critical bends and non-critical bends.

In the exemplary embodiment of FIG. 4A, tail 406 can have two critical bends along bend lines 408 and 410. If a crack forms along either bend line, then electrical connectivity may be lost.

Although a crack along a critical bend may result in a loss of electrical connectivity, a crack along a non-critical bend may not. In the exemplary embodiment of FIG. 4A, tail 406 can have one non-critical bend along bend line 412. This bend is also illustrated in FIG. 5 (bend line 510). If a crack forms along this bend line, electrical connectivity is not necessarily lost because the screw can provide an alternative path for electrons to flow.

As illustrated in FIG. 5, the head of screw 508 can be in direct electrical contact with the conductive side of tail 506. Even if a crack develops along bend line 510, electrons can flow from the tail's conductive surface to the screw's head and down the screw to the device chassis. Electrons can also flow along the same path in the opposite direction. Because the screw has a conductive surface, it can maintain the electrical connection between the device chassis, tail, and back plane even in the presence of a crack along the non-critical bend.

Corrosion

Corrosion can form between metal surfaces. In this exemplary embodiment, a non-conductive layer caused by corrosion may form (1) between the screw and the tail, and (2) between the tail and the device chassis.

Figure 6A:
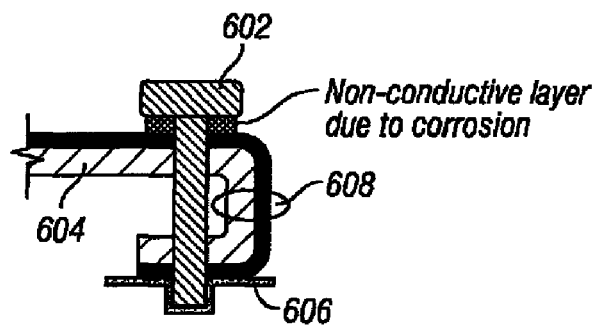
FIGS. 6A and 6B illustrate the formation of corrosion along the surfaces of the example tail of FIG. 5 according to embodiments of the disclosure.

FIG. 6A illustrates the formation of a non-conductive layer between screw 602 and tail 604 due to corrosion. If this non-conductive layer spreads across the entire area between tail 604 and screw 602, then electrons cannot flow between the head of screw 602 and tail 604. In the event that a crack forms along non-critical bend 608 as discussed above, electrons can no longer flow between the screw head and tail because of the intermediate non-conductive layer. This block can result in a loss of electrical connectivity.

Figure 6B:
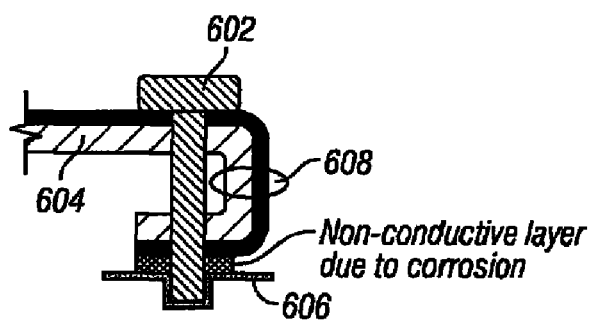

FIG. 6B illustrates the formation of a non-conductive layer between tail 604 and device chassis 606 due to corrosion. This non-conductive layer can prevent electrons from flowing between tail 604 and device chassis 606. However, screw 602 can be used as an electrical path between tail 604 and device chassis 606. Electrons can flow from the tail's conductive surface to the screw's head and down the screw to the device chassis. Electrons can also flow along the same path in the opposite direction. The path through the screw can maintain the electrical connection between the device chassis, screw, tail, and back plane.

Although corrosion can also form between screw 602 and the well of device chassis 606, the formation of a non-conductive layer between these components can be unlikely. Screw 602 can have threads running across its surface. These threads can block external contaminants from entering the well of device chassis 606 and, in turn, reduce the likelihood of corrosion formation.

Screw Interface

Electrical connectivity may be lost if the tail loses contact with the device chassis or back plane. This may occur, for example, if the screw that fastens these components together becomes loose or pops out. Although this problem can be fixed by tightening the screw, this tightening can impact the tail.

As illustrated in FIG. 5, the head of screw 508 can be in direct contact with the tail's electrically conductive surface. If the screw is tightened too much, a crack can form along the tail's electrically conductive surface and possibly affect the reliability of the electrical connection throughout the tail. A washer can be inserted between the screw head and the tail's electrically conductive surface to reduce the likelihood of crack formation as the screw is tightened. This washer may, for example, be a star washer.

Second Exemplary Embodiment

Figure 7A:
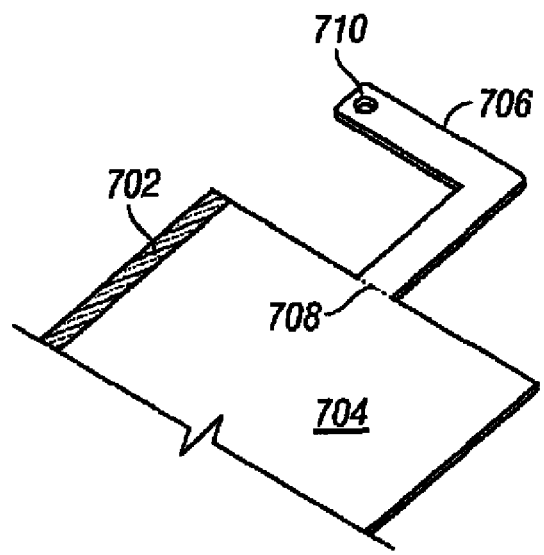
FIGS. 7A and 7B illustrate different configurations of an example tail having one critical bend according to embodiments of the disclosure.
Figure 7B:
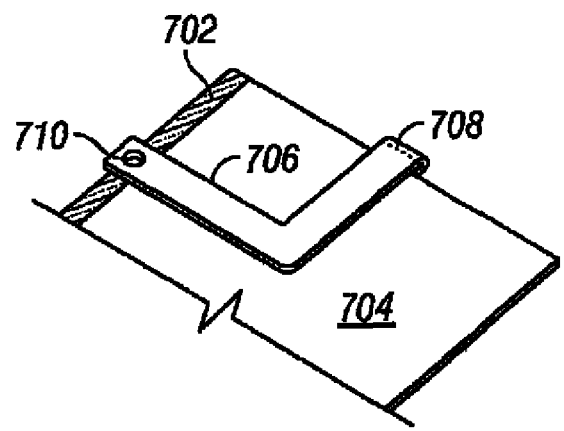

In a second exemplary embodiment, conductive film or tail 706 can be bent according to FIGS. 7A and 7B to connect back plane 704 to device chassis 702. FIG. 7A illustrates tail 706 in a first configuration. FIG. 7B illustrates tail 706 in a second configuration. Tail 706 can be bent from right to left along bend line 708 to transition from the first configuration of FIG. 7A to the second configuration of FIG. 7B. As illustrated in FIG. 7B, tail 706 can rest on back plane 704. Bend line 708 can be a critical bend. A screw hole 710 is located at one end of tail 706.

In the configuration of FIG. 7B, a screw (not shown) can be inserted in hole 710 to fasten tail 706 to device chassis 702. Because tail 706 is connected to back plane 704 on its other end, fastening tail 706 to device chassis 702 can create an electrical connection between back plane 704, tail 706, and device chassis 702.

Figure 8:
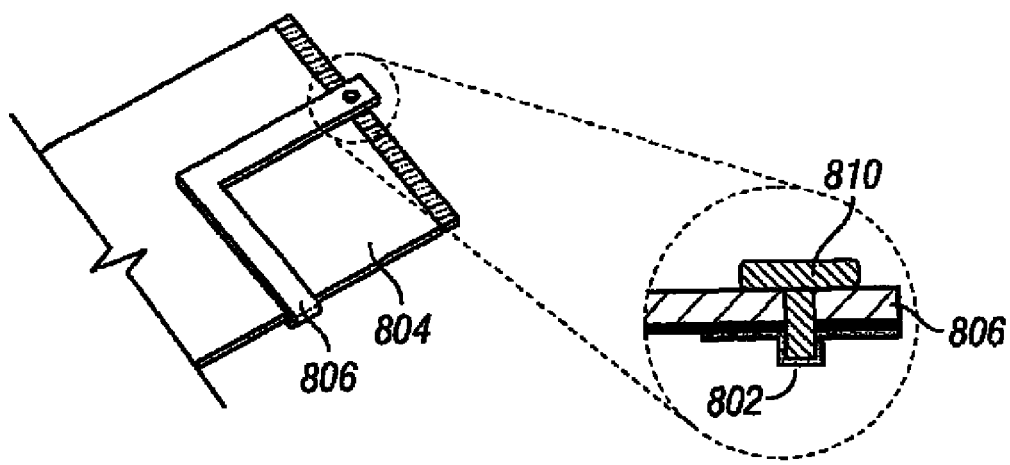
FIG. 8 illustrates a close-up of the example tail illustrated in FIG. 7B according to embodiments of the disclosure.

FIG. 8 illustrates a top of view of the tail from FIG. 7B and provides a detailed view of its surfaces. Tail 806 can lie on back plane 804 and can have two surfaces. The hatched surface of tail 806 can be non-conductive. The tail's opposing surface (not visible) can be electrically conductive. The conductive surface can be in direct contact with back plane 804.

FIG. 8 also illustrates an enlarged cross-sectional view of tail 806 and device chassis 802. A screw 810 can be inserted into the screw hole to fasten tail 806 and device chassis 802 together. As shown in the enlarged view, the tail's non-conductive (hatched) side may be in contact with the screw's head. The tail's conductive (black) side may be in contact with device chassis 802. Because the conductive side of tail 806 is also in contact with back plane 804, an electrical connection exists between the back plane, tail, and device chassis. By virtue of this electrical connection, the back plane can be electrically connected to the device chassis. Because sense amplifiers (not shown) can also be connected to device chassis 802, back plane 804 and the sense amplifiers can be connected the same electrical reference point.

This exemplary embodiment will now be described with respect to the failure conditions identified above.

Cracks

With regard to the formation of cracks in the tail, this exemplary embodiment can perform in a different manner than the tail of the first exemplary embodiment.

As described above with respect to FIG. 7A, tail 706 can have one critical bend along bend line 708. Because the number of critical bends in this exemplary embodiment (i.e., one) is less than the number of critical bends in the previous exemplary embodiment (i.e., two), there is a smaller probability that electrical connectivity will be lost.

Moreover, tail 706 may be immune to cracks along non-critical bends. Aside from the single fold along its critical bend line, tail 706 may not be folded again because it lies flat. As such, tail 706 has no non-critical bends. Because the number of non-critical bends in this exemplary embodiment (i.e., zero) is less than the number of non-critical bends in the first exemplary embodiment (i.e., one), there is a smaller probability that electrical connectivity will be lost.

Corrosion

Corrosion can form between metal surfaces but may not be as likely to form between a metal surface and a non-metal surface. The enlarged cross-sectional view of FIG. 8 illustrates that the non-conductive side (hatched) of tail 806 can be in direct contact with the head of screw 810. This non-conductive side may be formed from non-metallic material including, for example, PET or other plastic. Because the tail's non-metallic side is in contact with the screw head, corrosion cannot form between these components, at least as caused by reactions between the two components.

Figure 9:
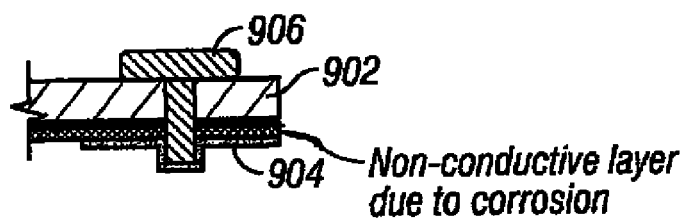
FIG. 9 illustrates the formation of corrosion along the surface of the example tail of FIG. 8 according to embodiments of the disclosure.

However, as illustrated in FIG. 9, corrosion can form a non-conductive layer between tail 902 and device chassis 904 because both components can be made from metal. The presence of this non-conductive layer can eliminate the only electrical connection available between the tail and device chassis. Unlike the first embodiment, screw 906 cannot provide an alternative path for electrons to flow because the screw is in contact with the non-conductive side of tail 902. If the tail-device chassis interface corrodes, then a non-conductive layer can spread across the entire interface which can cause a total loss of electrical connectivity.

Screw Interface

As is well known in the art, the mechanical connection between a metal surface and a plastic surface can be more secure than the mechanical connection between a metal surface and another metal surface. Because plastic is softer than metal, a plastic surface can act as a cushion for the metal surface. The enlarged view of FIG. 8 illustrates that the non-conductive side of tail 806 can be in contact with the head of screw 810. This non-conductive side can be made, for example, from PET or other plastic and can act as a cushion for the head of the screw as screw 810 is tightened, effectively acting as a lock washer for the screw. This screw interface can provide a more secure mechanical connection than the metal-to-metal screw interface of the first exemplary embodiment.

Third Exemplary Embodiment

Figure 10A:
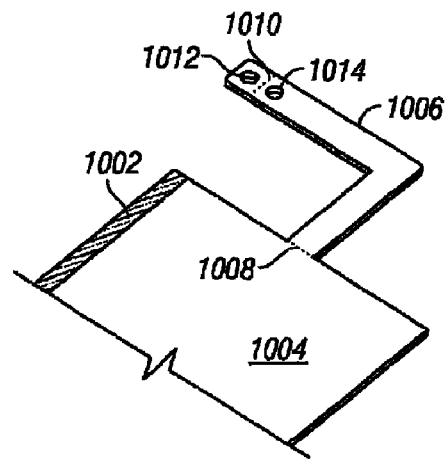
FIGS. 10A, 10B, and 10C illustrate different configurations of an example tail having one critical bend and one non-critical bend according to embodiments of the disclosure.
Figure 10B:
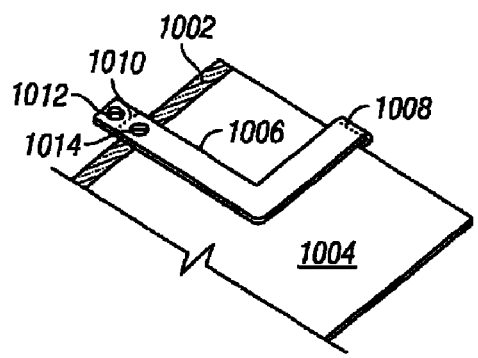
Figure 10C:
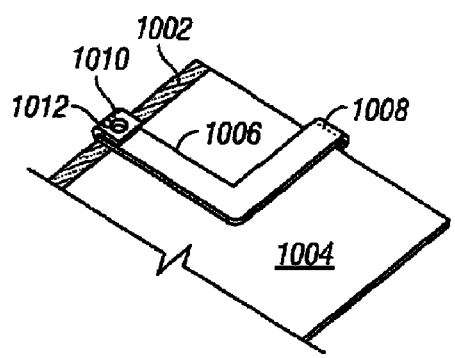

In a third exemplary embodiment, conductive film or tail 1006 can be bent according to FIGS. 10A, 10B, and 10C to connect backplane 1004 to device chassis 1002. FIGS. 10A, 10B, and 10C illustrate tail 1006 in three different configurations. Tail 1006 can transition from one configuration to another configuration by bending it along its bend lines.

In the first configuration, tail 1006 rests in a flattened configuration to the right of back plane 1004. Tail 1006 can have two bend lines 1008 and 1010. Bend line 1008 is a critical bend, and bend line 1010 is a non-critical bend. On either side of bend line 1010 are two holes 1012 and 1014 which can accommodate a screw (not shown). The hatched region can correspond to device chassis 1002.

FIG. 10B illustrates tail 1006 in a second configuration. To transition from the first configuration to the second configuration, tail 1006 can be folded from right to left along bend line 1008 such that tail 1006 rests along back plane 1004.

FIG. 10C illustrates tail 1006 in a third configuration. To transition from the second configuration to the third configuration, tail 1006 can be folded along bend line 1010 such that that hole 1012 lies on top of hole 1014. In this configuration, tail 1006 can connect back plane 1004 to device chassis 1002 by inserting a screw (not shown) through aligned holes 1012 and 1014. This connection is shown with more detail in FIG. 11.

Figure 11:
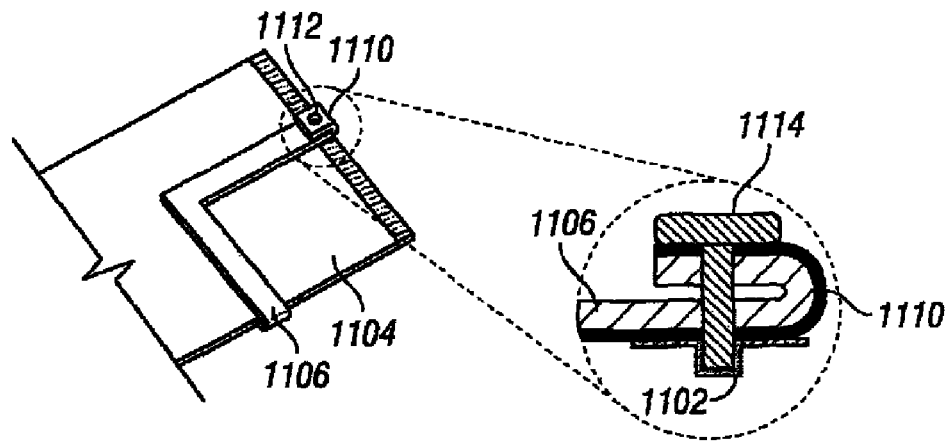
FIG. 11 illustrates a close-up of the example tail illustrated in FIG. 10C according to embodiments of the disclosure.

FIG. 11 illustrates a top of view of the tail from FIG. 10C and provides a detailed view of its surfaces. The hatched surface of tail 1106 can be non-conductive. The tail's opposing black surface can lie on back plane 1104 and can be electrically conductive. Tail 1106 can be folded over itself along bend line 1110 such that its conductive side faces up.

FIG. 11 also illustrates an enlarged cross-sectional view of tail 1106 and device chassis 1102. A screw 1114 can be inserted into the screw holes to fasten tail 1106 to device chassis 1102. As shown in the cross-sectional view, the tail's conductive (black) side may be in contact with the head of screw 1114 and device chassis 1102. Because the conductive side of tail 1106 is also in contact with back plane 1104, an electrical connection can form between the back plane, tail, and device chassis. Because sense amplifiers (not shown) can also be connected to device chassis 1102, back plane 1104 and the sense amplifiers can be connected the same electrical reference point.

This exemplary embodiment will now be described with respect to the failure conditions identified above.

Cracks

As illustrated in FIG. 10A, tail 1006 can have one critical bend along bend line 1008. Because tail 1006 has the same number of critical bends (i.e., one) as the tail in the second exemplary embodiment, the likelihood that electrical connectivity will be lost due to a crack in the critical bend may be approximately the same in both exemplary embodiments.

FIG. 10A also illustrates that tail 1006 can have a non-critical bend along bend line 1010. This bend is illustrated with greater detail in FIG. 11 (bend line 1110). If a crack forms along bend line 1110, electrical connectivity may not be lost because tail 1106 is stretched along the surface of device chassis 1102.

With regard to non-critical bends, the tail in this exemplary embodiment can perform in a different manner than the tail in the first exemplary embodiment. In the first exemplary embodiment, a screw can be used as an alternative path for electrons to flow. This alternative path bypasses the crack along the non-critical bend. However, in order to maintain this electrical connection, electrons must travel from the device chassis to the screw, from the screw to the tail, and from the tail to the back plane. Each component in this chain introduces a resistance that impedes the flow of electrons.

In contrast, in this exemplary embodiment, there can be less resistance along the electrical connection because the tail can be in direct contact with the device chassis. This exemplary embodiment does not have to rely on the screw as an alternative path for electrons to flow because a direct path already exists between the tail and device chassis.

Corrosion

Figure 12A:
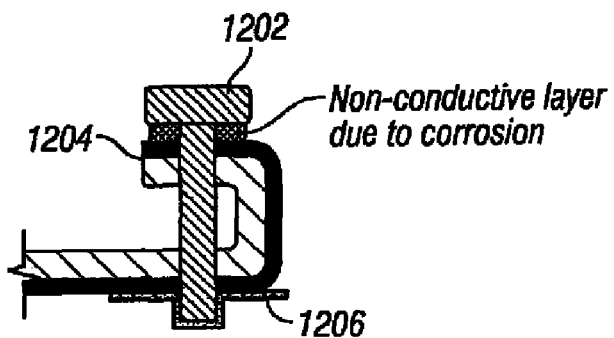
FIGS. 12A and 12B illustrate the formation of corrosion along the surfaces of the example tail of FIG. 11 according to embodiments of the disclosure.

FIG. 12A illustrates the formation of a non-conductive layer between screw 1202 and tail 1204 due to corrosion. This non-conductive layer can prevent electrons from flowing between the head of screw 1202 and tail 1204. The build-up of corrosion in this area, however, may not affect the electrical connection between tail 1204 and device chassis 1206 because the tail is in direct contact with the device chassis. Because the tail can be connected at its other end to a back plane, an electrical connection exists between the back plane, tail, and device chassis.

Figure 12B:
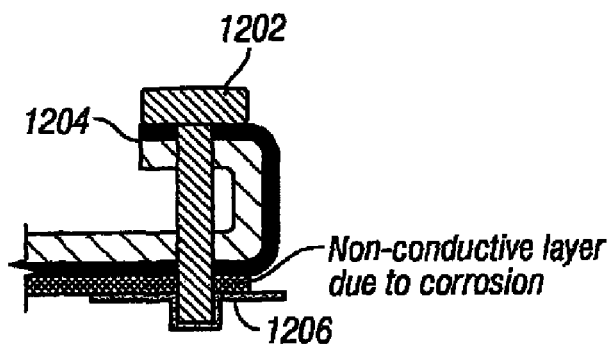

FIG. 12B illustrates the formation of a non-conductive layer between tail 1204 and device chassis 1206 due to corrosion. This non-conductive layer can prevent electrons from flowing between tail 1204 and device chassis 1206. Like the first exemplary embodiment, electrons can bypass this non-conductive layer and use screw 1202 can as an alternative path. Specifically, electrons can flow from the tail's conductive surface to the screw's head and down the screw to the device chassis. Electrons can also flow along the same path in the opposite direction. The path through the screw can maintain the electrical connection between the device chassis, screw, tail, and back plane.

Screw Interface

The screw interface in this embodiment is the same as the screw interface in the first exemplary embodiment. In both embodiments, the head of the metal screw can be in direct contact with the tail's electrically conductive surface. This can create a metal-to-metal interface. If the screw is tightened too much, a crack can form along the tail's electrically conductive surface and possibly affect the reliability of the electrical connection throughout the tail. Like the first exemplary embodiment, a washer can be inserted between the screw head and the tail's electrically conductive surface to reduce the likelihood of crack formation as the screw is tightened. This washer may, for example, be a star washer.

Figure 13:
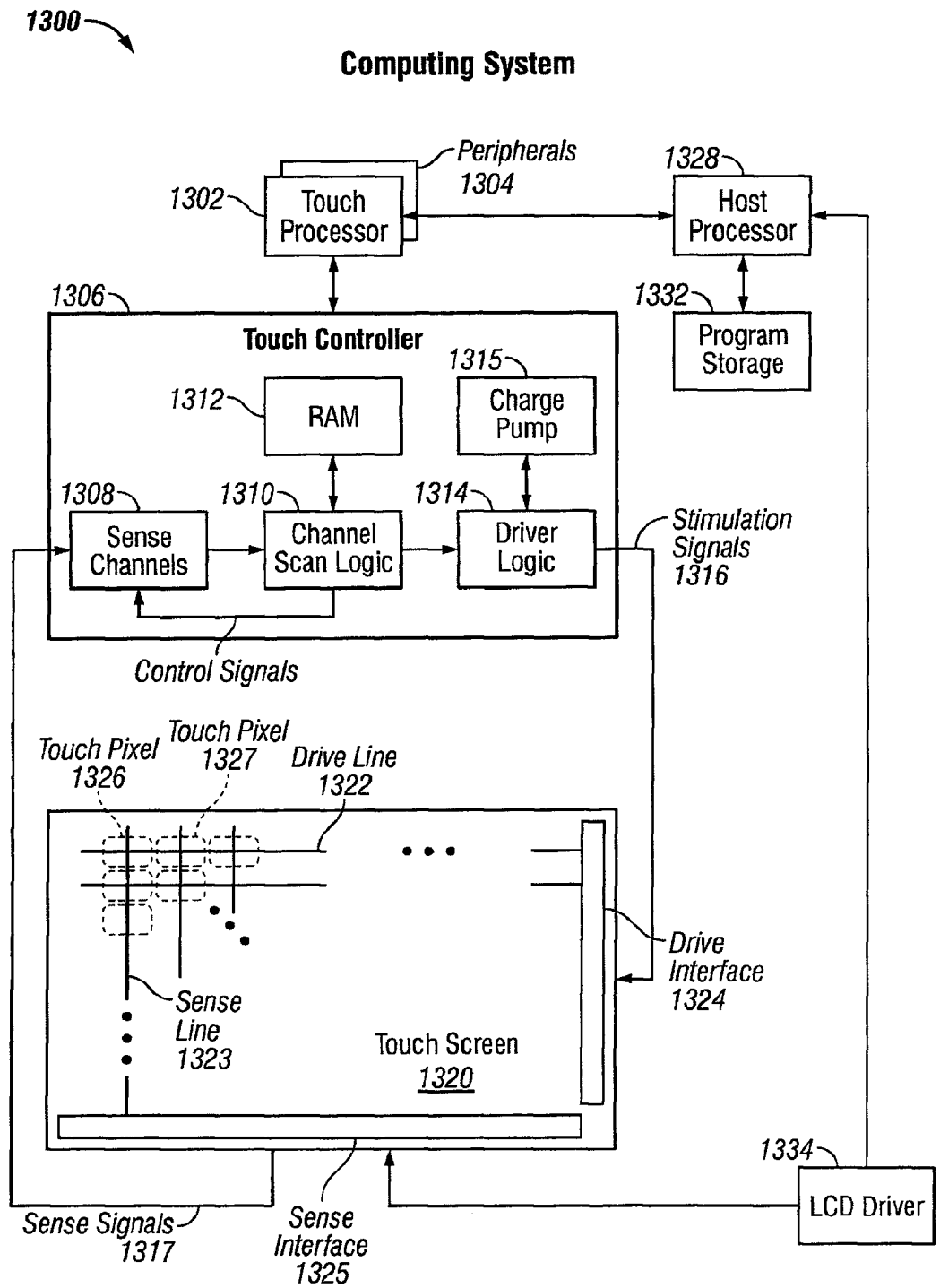
FIG. 13 illustrates a block diagram of an example computing system that can include one or more of the embodiments of the disclosure.

FIG. 13 is a block diagram of an example computing system 1300 that can include one or more of the exemplary embodiments described above. In the example of FIG. 13, the computing system is a touch sensing system 1300 and the display screen is a touch screen 1320, although it should be understood that the touch sensing system is merely one example of a computing system, and that the touch screen is merely one example of a type of display screen. Computing system 1300 could be included in, for example, mobile telephone, digital media player, personal computer, or any mobile or non-mobile computing device that includes a touch screen. Computing system 1300 can include a touch sensing system including one or more touch processors 1302, peripherals 1304, a touch controller 1306, and touch sensing circuitry (described in more detail below). Peripherals 1304 can include, but are not limited to, random access memory (RAM) or other types of memory or non-transitory computer-readable storage media capable of storing program instructions executable by the touch processor 1302, watchdog timers and the like. Touch controller 1306 can include, but is not limited to, one or more sense channels 1308, channel scan logic 1310 and driver logic 1314. Channel scan logic 1310 can access RAM 1312, autonomously read data from the sense channels and provide control for the sense channels. In addition, channel scan logic 1310 can control driver logic 1314 to generate stimulation signals 1316 at various frequencies and phases that can be selectively applied to drive regions of the touch sensing circuitry of touch screen 1320. In some embodiments, touch controller 1306, touch processor 1302 and peripherals 1304 can be integrated into a single application specific integrated circuit (ASIC). A processor, such as touch processor 1302, executing instructions stored in non-transitory computer-readable storage media found in peripherals 1304 or RAM 1312, can control touch sensing and processing, for example.

Computing system 1300 can also include a host processor 1328 for receiving outputs from touch processor 1302 and performing actions based on the outputs. For example, host processor 1328 can be connected to program storage 1332 and a display controller, such as an LCD driver 1334. Host processor 1328 can use LCD driver 1334 to generate an image on touch screen 1320, such as an image of a user interface (UI), by executing instructions stored in non-transitory computer-readable storage media found in program storage 1332, for example, to control the demultiplexers, voltage levels and the timing of the application of voltages as described above to apply voltage to a data line more than once during a write sequence. Host processor 1328 can use touch processor 1302 and touch controller 1306 to detect a touch on or near touch screen 1320, such a touch input to the displayed UI. The touch input can be used by computer programs stored in program storage 1332 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1328 can also perform additional functions that may not be related to touch processing.

Touch screen 1320 can include touch sensing circuitry that can include a capacitive sensing medium having a plurality of drive lines 1322 and a plurality of sense lines 1323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 1322 can be driven by stimulation signals 1316 from driver logic 1314 through a drive interface 1324, and resulting sense signals 1317 generated in sense lines 1323 can be transmitted through a sense interface 1325 to sense channels 1308 (also referred to as an event detection and demodulation circuit) in touch controller 1306. In this way, drive lines and sense lines can be part of the touch sensing circuitry that can interact to form capacitive sensing nodes, which can be thought of as touch picture elements (touch pixels), such as touch pixels 1326 and 1327. This way of understanding can be particularly useful when touch screen 1320 is viewed as capturing an "image" of touch. In other words, after touch controller 1306 has determined whether a touch has been detected at each touch pixel in the touch screen, the pattern of touch pixels in the touch screen at which a touch occurred can be thought of as an "image" of touch (e.g. a pattern of fingers touching the touch screen).

In some example embodiments, touch screen 1320 can be an integrated touch screen in which touch sensing circuit elements of the touch sensing system can be integrated into the display pixels stackups of a display.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A flexible tail configured to electrically connect a first component of a touch sensor panel to a second component of the touch sensor panel, the flexible tail comprising:
    a non-critical bend adjacent to a connection point between the flexible tail and the second component;
    a non-conductive side; and
    a conductive side in contact with the second component,
    wherein the flexible tail is configured to be fastened to the second component by inserting a screw through a hole in the flexible tail, and
    wherein the flexible tail is positioned to maintain electrical connectivity between the first component and the second component if the flexible tail cracks along the non-critical bend.

2. The flexible tail of claim 1, wherein the flexible tail is positioned by placing a first portion of the conductive side against the first component and a second portion of the conductive side against the second component, a transition from the first portion to the second portion having no bends.

3. The flexible tail of claim 2, wherein the flexible tail is further positioned by bending a third portion of the flexible tail over itself at the non-critical bend such that the conductive side lies underneath a head of the screw.

4. The flexible tail of claim 2, wherein the positioned flexible tail is configured to maintain electrical connectivity between the first component and the second component through the flexible tail's conductive side if the flexible tail cracks along the non-critical bend or if corrosion forms between a head of the screw and the flexible tail.

5. The flexible tail of claim 3, wherein the positioned flexible tail is configured to maintain electrical connectivity between the first component and the second component through the screw if corrosion forms between the flexible tail and the second component.

6. The flexible tail of claim 1, wherein the flexible tail is positioned by placing a first portion of the non-conductive side against the first component and bending a second portion of the flexible tail underneath itself at the non-critical bend such that the conductive side of the flexible tail lies against the second component.

7. The flexible tail of claim 6, wherein the positioned flexible tail is configured to maintain electrical connectivity between the first component and the second component through the screw if the flexible tail cracks along the non-critical bend or if corrosion forms between the flexible tail and the second component.

8. The flexible tail of claim 1, wherein the second component is electrically connected to earth ground.

9. The flexible tail of claim 1, wherein the conductive side is made from aluminum or copper and the non-conductive side is made from PET or plastic.

10. The flexible tail of claim 1, wherein the flexible tail has a critical bend at a connection point between the flexible tail and the first component.

11. The flexible tail of claim 1, wherein a washer is placed between the conductive side of the flexible tail and a head of the screw.

12. The flexible tail of claim 1, wherein the first component is a back plane of the touch sensor panel and the second component is a body of the touch sensor panel.

13. A flexible tail configured to electrically connect a first component of a touch sensor panel to a second component of the touch sensor panel, the flexible tail comprising:
   a non-conductive side; and
   a conductive side in contact with the second component,
   wherein the flexible tail is positioned to maintain electrical connectivity between the first component and the second component if corrosion forms between the flexible tail and a head of a screw.

14. The flexible tail of claim 13, wherein the flexible tail is positioned by placing a first portion of the conductive side against the first component and a second portion of the conductive side against the second component, a transition from the first portion to the second portion having no folds.

15. The flexible tail of claim 13, wherein the flexible tail is free of non-critical bends.

16. The flexible tail of claim 13, wherein the first component is a back plane of the touch sensor panel and the second component is a body of the touch sensor panel.

17. A method for electrically connecting a first component of a touch sensor panel to a second component of the touch sensor panel, comprising:
   forming a flexible tail, the flexible tail having
      a non-critical bend adjacent to a connection point between the flexible tail and the second component,
      a non-conductive side, and
      a conductive side in contact with the second component;
   fastening the flexible tail to the second component by inserting a screw through a hole in the flexible tail; and
   positioning the flexible tail to maintain electrical connectivity between the first component and the second component if the flexible tail cracks along the non-critical bend.

18. The method of claim 17, wherein positioning the flexible tail comprises placing a first portion of the conductive side against the first component and a second portion of the conductive side against the second component, the transition from the first portion to the second portion having no bends.

19. The method of claim 18, wherein positioning the flexible tail further comprises bending a third portion of the flexible tail over itself at the non-critical bend such that the conductive side lies underneath a head of the screw.

20. The method of claim 17, wherein positioning the flexible tail comprises placing a first portion of the non-conductive side against the first component and bending a second portion of the flexible tail underneath itself at the non-critical bend such that the conductive side of the flexible tail lies against the second component.

21. The method of claim 17, wherein the first component is a back plane of the touch sensor panel and the second component is a body of the touch sensor panel.

22. A method for electrically connecting a first component of a touch sensor panel to a second component of the touch sensor panel, comprising:
   forming a flexible tail, the flexible tail having
      a non-conductive side, and
      a conductive side in contact with the second component; and
   positioning the flexible tail to maintain electrical connectivity between the first component and the second component if corrosion forms between the flexible tail and a head of a screw.

23. The method of claim 22, wherein positioning the flexible tail includes placing a first portion of the conductive side of the flexible tail against the first component and a second portion of the conductive side of the flexible tail against the second component, the transition from the first portion to the second portion having no folds.

24. The method of claim 23, wherein the first component is a back plane of the touch sensor panel and the second component is a body of the touch sensor panel.

* * * * *